W. A. COLLINGS.
CONNECTOR FOR REINFORCING RODS.
APPLICATION FILED DEC. 27, 1915.
1,213,589.
Patented Jan. 23, 1917.
2 SHEETS—SHEET 1.
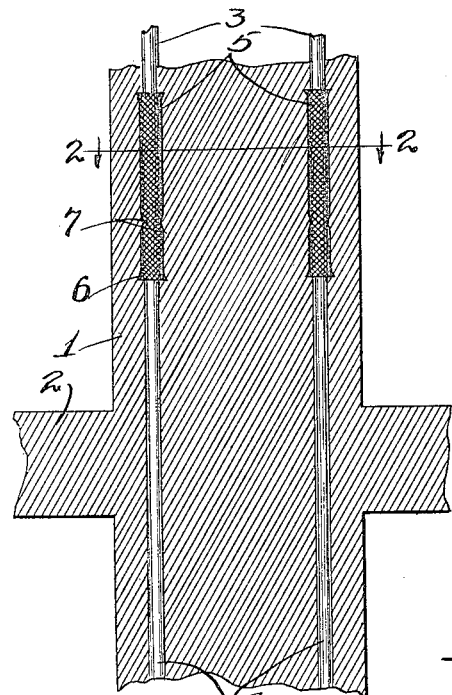
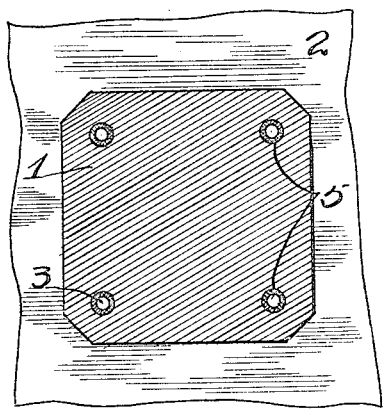
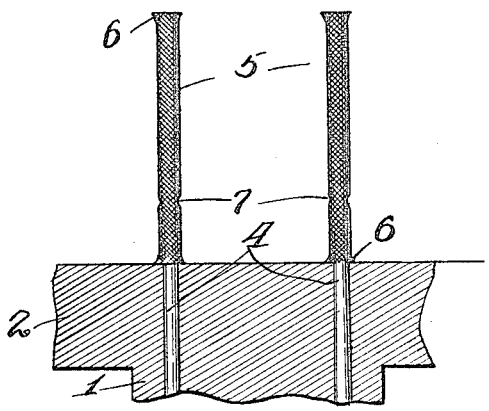
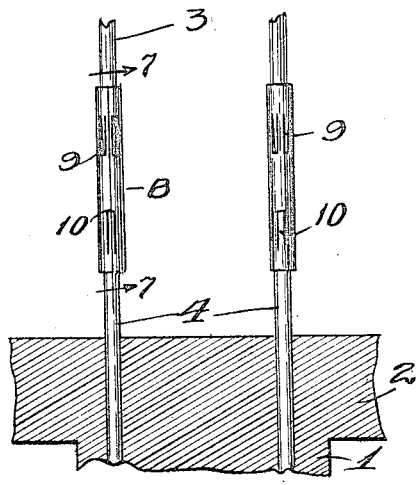
Witnesses
J. W. Angell
Inventor
William A. Collings
by Charles W. Hill
Atty.

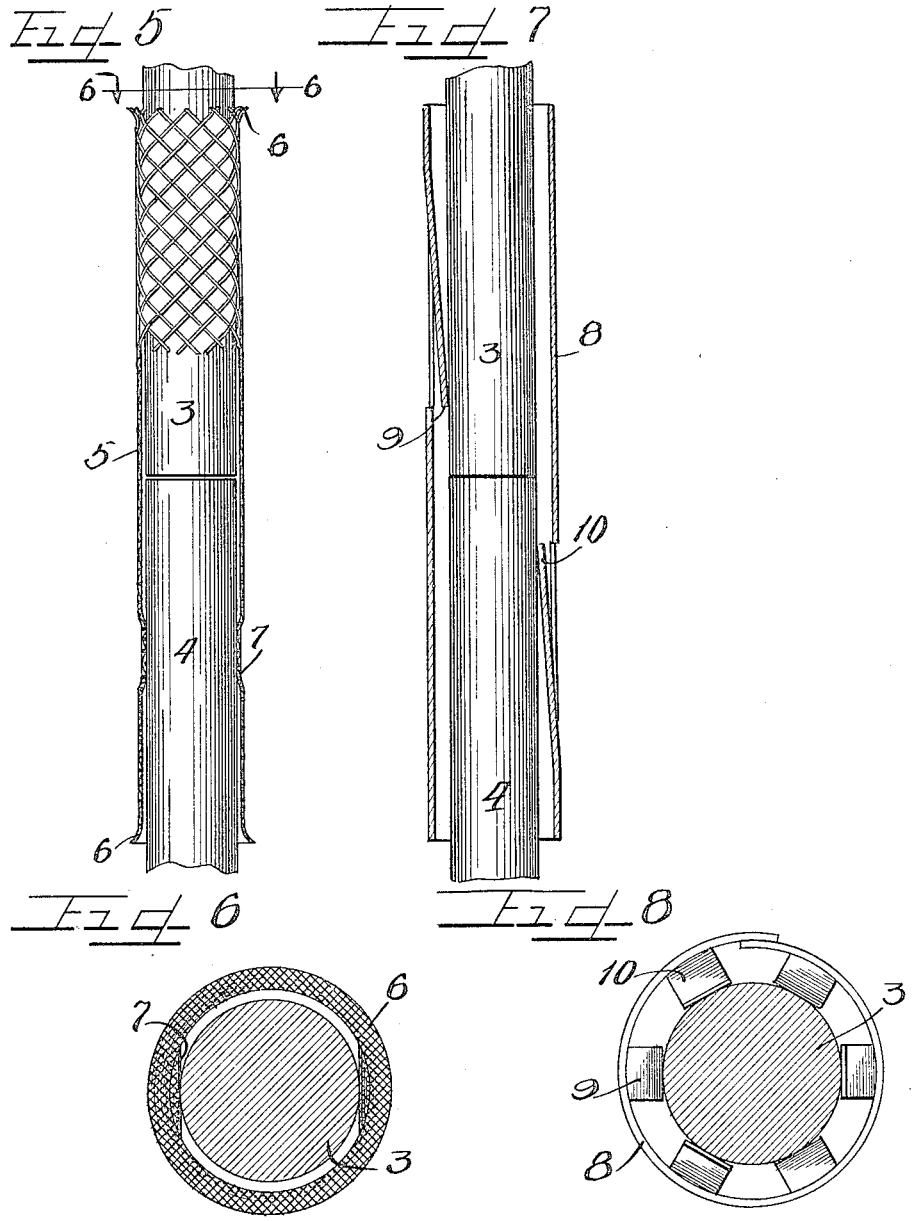

UNITED STATES PATENT OFFICE.

WILLIAM ARTHUR COLLINGS, OF KANSAS CITY, MISSOURI.

CONNECTOR FOR REINFORCING-RODS.

1,213,589.  Specification of Letters Patent.  Patented Jan. 23, 1917.

Application filed December 27, 1915. Serial No. 68,809.

*To all whom it may concern:*

Be it known that I, WILLIAM A. COLLINGS, a citizen of the United States, and a resident of Kansas City, in the county of Jackson and State of Missouri, have invented certain new and useful Improvements in Connectors for Reinforcing-Rods; and I do hereby declare that the following is a full, clear, and exact description of the same, reference being had to the accompanying drawings, and to the numerals of reference marked thereon, which form a part of this specification.

In reinforced concrete construction work, considerable difficulty is usually encountered in properly joining the reinforcing rods, especially the vertical rods used in the construction of concrete columns. The method most commonly used is that of overlapping the reinforcing rods a distance of approximately thirty times the diameter of the rods, which practice necessitates a certain waste of costly material due to the overlapping ends of the rods, and the rods frequently shift or move away from each other, often becoming entirely displaced from their proper position, thus tending to produce a weakened structure.

This invention relates to improved metallic connectors for reinforced concrete column construction work, constructed of key expanded metal lath, wire lath, wire mesh, or perforated sheet metal bent into cylindrical form adapted to be engaged around the abutting ends of reinforcing rods to retain the same in alinement, and to permit a free flow of concrete through the openings of the connectors allowing the concrete to bond with the rods.

It is an object of this invention to construct a connector to fit around abutting ends of reinforcing rods adapted to permit a flow of concrete therethrough to form a bond between the rods and the connector.

It is an important object of this invention to construct a connector of expanded metal lath formed to closely fit around abutting ends of reinforcing rods to permit concrete to pass therethrough and bond therewith.

It is also an object of this invention to construct a connector of wire lath or perforated metal to fit over abutting ends of reinforcing rods in column constructions and indented to prevent slipping thereof on the rods and to hold the rods in alinement permitting concrete to flow therethrough to bond around the rods.

It is furthermore an object of this invention to construct a metallic coupling or connector for reinforcing rods comprising a cylindrical sleeve having inwardly directed tongues or projections for contact with the rods to maintain the same in alinement and to permit concrete to pass therethrough to bond around said connector and said rods.

It is finally an object of this invention to construct a connector for reinforcing rods in column construction, simple, inexpensive and durable.

The invention (in a preferred form) is illustrated in the drawings and hereinafter more fully described.

In the drawings: Figure 1 is a vertical section through a concrete column and floor showing reinforcing rods abutting one another and equipped with connectors embodying the principles of my invention positioned a short distance above the floor. Fig. 2 is a cross section taken on line 2—2 of Fig. 1. Fig. 3 is a section through a column and floor showing reinforcing rods extending above the floor and equipped with connectors resting upon the floor in position to receive rods in the upper ends thereof. Fig. 4 shows a modified form of connector in a position for use similar to that shown in Fig. 1. Fig. 5 is an enlarged detail view partly broken away, of the connector shown in Fig. 1. Fig. 6 is a section taken on line 6—6 of Fig. 5. Fig. 7 is an enlarged section of the modified form of device taken on line 7—7 of Fig. 4. Fig. 8 is a top plan view thereof.

As shown in the drawings: the reference numeral 1, designates a concrete column extending through and integral with a concrete floor 2, and reinforced by abutting upper and lower reinforcing rods 3 and 4 respectively. Mounted over each of the abutting ends of said rods 3 and 4, is a long cylindrical connector or sleeve 5, formed of expanded metal lath, wire lath, or other suitable material and bent outwardly or bell shaped at its upper and lower ends as indicated by the numerals 6, and deformed or sprung inwardly on opposite sides near the lower end thereof, as denoted by the reference numeral 7, adapted to fit snugly around the rod 4, to prevent the connector 5, from slipping out of position during the concreting process.

In the modified form of my device shown in Figs. 4, 7 and 8, the connector consists of a metal tube 8, having a plurality of integral tongues 9 and 10, stamped or cut and bent inwardly therefrom. Said tube 8, fits around the abutting ends of the rods 3 and 4, with the upper tongues 9, directed downwardly and the lower tongues 10, directed upwardly to bear against the surfaces of the rods 3 and 4, as clearly shown in Fig. 7, and with said tongues 10, staggered with respect to the tongues 9.

The operation is as follows: In monolithic concrete construction where the supporting pillars or columns extend upwardly from floor to floor, after completing one floor the lower column rods 4, from the column below are left to extend above the floor for a short distance of about three feet, the connectors 5, are then fitted over the upper ends of said rods 4, and held thereon by the indented portions 7, which grip on opposite sides of the rods 4. The upper rods 3, are then inserted into the upper ends of the connectors 5, until the lower ends thereof abut the upper ends of the rods 4. Concrete, of a creamy consistency, is then poured into the form for the columns around the rods, passing through the openings in the expanded metal connectors 5, and inwardly at the upper and lower bell shaped ends 6 thereof, thus forming bonding around and between the reinforcing rods and the connectors.

In the modified form of the device shown in Figs. 4, 7, and 8, the metal is bent around into a cylindrical or tubular form until the margins of said plate overlap and are secured together by any suitable means. The connector is then engaged over the upper end of the reinforcing rod 4, with the tongues 10, which are directed inwardly and upwardly bearing against the surface of the rod to hold the connector in position. The rod 3, is then inserted into the connector from above, the tongues 9, which are inwardly and downwardly directed, permitting easy entrance of the rod 3. With the tongues 9 and 10, directed as above explained, there is no difficulty encountered due to the free ends of the tongues catching in rough places in the rods. With the connector in position, the concrete is poured around the rods and the connector, and passes through the apertures and the upper and lower ends of the connector to form a bond.

It will be observed, by reference to the enlarged detail views of Figs. 5, 6, 7 and 8, that in both of said constructions the connector when positioned upon the abutting ends of the rods 3 and 4 is spaced somewhat away from the latter, thereby leaving ample room for the flow of concrete between said connectors and the reinforcement rods, whereby a more perfect binding is obtained as to all of the parts.

It will, of course, be understood that any of the different types of connectors above described may be bent into cylindrical or polygonal form with the abutting or overlapping margins soldered or secured together by any suitable means, before the connectors are delivered for use, or the connectors may be shipped in the form of plates or sheets and bent into form when required.

I am aware that various details of construction may be varied through a wide range without departing from the principles of this invention, and I therefore do not purpose limiting the patent granted otherwise than necessitated by the prior art.

I claim as my invention:

1. An apertured cylindrical connector for reinforcement rods, and integral inwardly projected portions thereon adapted to engage the sides of the reinforcement rods to hold the connector in position for connecting said rods and to space said connector from said rods.

2. In a device of the class described, the combination with abutting reinforcment rods, of an apertured connector engaged on the abutting ends of said rods, and means integral with said connector adapted to hold the same positioned upon said rods and spaced therefrom to permit concrete to flow between said rods and said connector.

3. A connector of the class described, comprising a tube, and a plurality of means struck inwardly therefrom and projecting in opposite directions, said means acting to space said tube from the inclosed reinforcement members.

4. A connector of the class described, comprising a tube, and a plurality of tongues struck inwardly therefrom and projecting in opposite directions, said tongues acting to space said tube from the inclosed reinforcement members.

5. In a device of the class described, rods placed end to end, a tube therearound, and oppositely directed integral means arranged on said tube adapted to hold said rods in alinement for concreting and to space said tube from said rods.

6. The combination with abutting reinforcement rods, of a perforated sleeve therearound, and a plurality of integral inwardly directed tongues adapted to coact with said rods to hold the same in alinement, said perforations adapted to permit a flow of concrete therethrough to produce a strong bond between said reinforcing members and the concrete and said tongues adapted to space said tube from said rods.

In testimony whereof I have hereunto subscribed my name in the presence of two subscribing witnesses.

WILLIAM ARTHUR COLLINGS.

Witnesses:
J. O. YOUNG,
S. H. MIDDAUGH.